(12) United States Patent
Smithson

(10) Patent No.: US 6,842,111 B1
(45) Date of Patent: Jan. 11, 2005

(54) INTEGRATED MULTIFUNCTION FLASHER SYSTEM

(76) Inventor: Bradley D. Smithson, 1155 Insight Drive, Nelson BC (CA), V1L 5P5

(*) Notice: Subject to any disclaimer, the term of this patent is extended or adjusted under 35 U.S.C. 154(b) by 0 days.

(21) Appl. No.: 10/465,026

(22) Filed: Jun. 18, 2003

(51) Int. Cl.[7] .................................................. B60Q 1/26
(52) U.S. Cl. ........................ 340/468; 340/468; 340/475; 340/478; 340/331; 340/332
(58) Field of Search ................................ 340/468, 475, 340/478, 465, 464, 331, 332; 362/498, 499

(56) References Cited

U.S. PATENT DOCUMENTS

| | | | |
|---|---|---|---|
| 4,380,753 A | * | 4/1983 | Gant ........................... 340/471 |
| 5,166,672 A | | 11/1992 | Duneau |
| 5,632,551 A | | 5/1997 | Roney et al. |
| 5,877,682 A | | 3/1999 | Groeller |
| 6,133,852 A | | 10/2000 | Tonkin |
| 6,250,788 B1 | | 6/2001 | Muller |
| 6,710,709 B1 | * | 3/2004 | Morin et al. ................. 340/468 |
| 2002/0036908 A1 | | 3/2002 | Pederson |

FOREIGN PATENT DOCUMENTS

JP            363106153 A        5/1988

* cited by examiner

Primary Examiner—Daryl C. Pope
(74) Attorney, Agent, or Firm—Shughart Thomson & Kilroy, PC

(57) ABSTRACT

An integrated multifunction flasher system includes a pair of light units, each light unit housing an LED array, LED switches, and a programmed controller within an enclosure. The controllers of the pair of units are interconnected and are additionally connected to the turn signal wiring, the backup signal wiring, and to a manually operated switch. The controllers sense the operation of the turn signals, the backup lamps, and the manual switch and cooperate to generate flash patterns which parallel the turn and hazard flasher signals and which generate alternating strobe patterns in response to activation of the backup lamp or closure of the manual switch.

19 Claims, 4 Drawing Sheets

INTEGRATED MULTIFUNCTION FLASHER SYSTEM

BACKGROUND OF THE INVENTION

Warning lights are universally used on vehicles to alert other drivers and pedestrians to their presence. Vehicles such as trash collection vehicles, mail delivery vehicles, and similar vehicles have particular traffic effects, since they move slowly and stop frequently. Additionally, such vehicles must often be backed-up, for example, to maneuver into and out of dead end streets, parking lots, and the like. Therefore, it is prudent to provide such vehicles with effective warning devices to alert other drivers and pedestrians of their presence. By law, all such vehicles must be provided with tail lights, brake lights, back-up lights, hazard flashers, and, often, back-up sounders. Some localities may also require such vehicles to be provided with additional lights, such as rotating or blinking lights, strobe flashers, or similar auxiliary warning lights.

Auxiliary warning lights for vehicles which operate in a slow-moving and frequently-stopping manner have often been provided as add-on light units which are manually activated and which operate in uncoordinated flashing patterns. Such lights have not usually been wired in with existing warning devices and are, thus, only activated if the driver remembers to activate the lights. However, when such lights are activated, they have usually been effective in alerting others of the presence of the vehicles on which they are installed.

There have been a number of warning light systems which provide multiple warning functions and which are controlled by programmed microprocessors. Most such systems are of the type which are provided as light bar systems, as are used on some police vehicles, fire fighting vehicles, ambulances, and the like. Such systems are capable a selection of light colors and a variety of flash patterns which can be selected by operation of switches mounted on a panel within the vehicle. While such warning light systems are appropriate for emergency response type vehicles, they tend to be expensive and are not really appropriate for the needs of trash pickup trucks and similar vehicles.

In order to provide some coordination with existing warning devices, auxiliary warning lights have been combined with controller units which are interconnected to existing turn signals, backup lights, and the like. The controller unit electrically senses activation of the existing warning lights and causes activation of the auxiliary warning lights in coordination with the existing warning lights. Coordinated auxiliary light combinations of this type have made use of generic vehicle types of lights, usually in combination with separate controller units.

In the past, many types of warning lights, particularly for vehicles, have employed incandescent types of lamps. Although incandescent lamps have provided useful service for illumination and warning lights, there are some negative aspects to incandescent lamps. Incandescent lamps with evacuated glass envelopes are susceptible to breakage. The filaments used in such lamps are also vulnerable to breakage from shocks, vibration, and fatigue over time from thermal expansion and contraction. Incandescent lamps also produce heat by the mechanism through which they produce light, namely electrical resistance.

Other illumination sources besides incandescent lamps have been considered and implemented for both illumination purposes and signaling or warning light purposes, such as ionized gas or gas discharge lights (xenon, halogen, etc.) and solid state lights, including light emitting diodes (LED's). Light emitting diodes are considerably less vulnerable to damage from shock and vibration than incandescent lamps and consume less electrical power for a comparable level of illumination. More recently, light emitting diodes have been developed which can be operated at illumination levels which, in large enough arrays, meet the photometric standards required by regulations and industry standards for vehicle mounted warning lights.

In order to provide coordinated functioning from a pair of auxiliary light units, without the use of an external controller circuit, the coordinated flasher system 900 shown in FIG. 1 was developed. The prior art system 900 is embodied as Model numbers 417, 418, 420, 423, and 794, as manufactured Peterson Manufacturing Company of Grandview, Mo. The system 900 includes light units 902 and 904. Each of the units 902 and 904 includes a light emitting diode (LED) array 906 which is enabled by one or more LED switches or drivers 908, which may be power transistors. The LED switches 908 are, in turn, selectively enabled by a controller or processor 910 mounted internally within each of the light units 902 or 904.

Each controller 910 is connected through switch sensor circuitry 912 to a manually operated cab switch 914 which is mounted in a cab of a vehicle on which the system 900 is installed. The cab switch 914 is connected to the vehicle battery 915 and when closed applies a detectable signal to the switch sensor 912. Additionally, the cab switch 914 is connected internally within the light unit 902 or 904 to the LED switch sets 908 and provide operating power to the LED array 906 when the LED switches 908 are activated. The switch sensor 912 provides level shifting between the battery voltage and the voltage required by the controller 910, which is a programmed microprocessor or microcontroller. Closure of the cab switch 914 is sensed by the controllers 910 through the switch sensor circuits 912. The controllers 910 respond by outputting signals to the LED switch sets 908 to cause each LED array 906 to flash in selected patterns. As thus described, there is no timing coordination between the flash patterns generated by the light units 902 and 904, such that the flash patterns, while defined with respect to a given light unit 902 or 904, are somewhat random with respect to one another. When the cab switch 914 is opened, the flash patterns of the LED arrays 906 cease.

The illustrated flasher system 900 provides coordination between the light units 902 and 904 by the provision of mode communication ports 916 within each unit 902 and 904 and interconnecting the ports 916. The ports 916 are bidirectional serial communication ports interfaced with the controllers 910 and communicate timing and function or mode data between the units 902 and 904. The light units 902 and 904 are provided in two versions—a synchronous version with a synchronous program stored in the controller 910 and an alternating version with an alternating program. If two synchronous versions are combined, the controllers 910 cooperate through the mode communication ports 916 to provide flash patterns which are synchronous. On the other hand, if a synchronous version is combined with an alternating version, the controllers 910 cooperate through the ports 916 to provide a flash pattern which alternates from one light unit 902 to the other unit 904. The data passed by way of the ports 916 enables each controller 910 to detect the program version of the opposite controller 916 without the need to set physical mode switches. The illustrated system 900 does not combine light units 902 and 904 in which both controllers 910 are alternating versions.

Although the system 900 provides coordinated warning light patterns without the need of external controller circuitry, a system which could additionally coordinate with existing warning lights, such as turn signals, hazard flashers, backup signals, and the like, without the need of external controller circuitry is desirable, particularly for slow-moving and frequently-stopping vehicles.

SUMMARY OF THE INVENTION

The present invention provides an integrated multifunction flasher system which cooperates with existing warning light functions of a vehicle, which adds a manually activated warning strobe function, and which does not require external controller circuitry. In general, the flasher system comprises a pair of light units, each unit including a unit enclosure housing an array of light emitting diodes (LED's), a set of LED switches which are preferably transistors or the like and which can be controlled to apply electrical power to the LED array, and a controller or processor connected to the LED switches and programmed to activate the LED array under selected conditions. The light units are used in pairs of a left unit and a right unit. The processors of a pair of units are interconnected through a communication port on each and coordinate their functioning to cause the LED arrays to act in parallel with existing turn signals and hazard flashers and to provide selected flash patterns in response to activation of an existing backup lamp of the vehicle or the operation of an auxiliary strobe switch in the cab of the vehicle.

Each light unit has a turn signal terminal, an auxiliary terminal, a sync/mode or communication port terminal, and a ground or common terminal. The turn signal or turn indicator terminal is connected to vehicle wiring for a turn signal lamp. The auxiliary terminal may be either a backup signal terminal or a strobe signal terminal, depending on which of the left and right light units such functions are associated with. In a preferred embodiment of the present invention, the backup terminal is on the left side unit, and the strobe terminal is on the right side unit. The backup terminal of the left side unit is connected to wiring for the backup lamp, and the strobe terminal of the right side unit is connected to a manually operated strobe switch mounted for operation by the vehicle driver, such as in the vehicle cab. The sync/mode terminals of the left and right side units are interconnected, and each ground terminal is connected to the vehicle ground.

The processors of the light units are programmed to detect signals on the turn, auxiliary, and mode terminals and to provide particular illumination patterns in response to the signals, or combination of signals, so detected. Because turn signals are usually a universal legal requirement, in a preferred embodiment of the present invention, turn signals are given precedence over all other signals detected. In typical vehicles, turn signals are intermittent on/off battery voltage level pulses which are provided by a turn signal flasher unit in response to manual operation of a vehicle turn signal lever by the driver. The intermittent turn signal is applied to a turn light unit corresponding to the direction the driver wishes to turn. Hazard flashers are similar to turn signals, except that they are applied to both turn light units simultaneously. The processor of a light unit responds to the presence of a turn signal on the turn signal terminal by enabling the LED switches to conduct, thereby allowing the intermittent turn signal to illuminate the LED array on the appropriate side. The processor of a light unit receiving a turn signal also communicates an appropriate mode signal to the other light unit, causing it to cease any flash patterns it is generating, unless it also is also receiving a turn signal, thus indicating activation of the hazard flashers. In a similar manner, the presence of an appropriate voltage level on the auxiliary terminal of either light unit, in the absence of a turn signal on the turn signal terminal, causes the processors of the interconnected light units to create a strobing flash pattern which alternates from one light unit to the other. Although not implemented in the preferred embodiment, programming for the processors can be such that the flash pattern for a backup signal is different from a flash pattern activated by operating the strobe switch.

The circuitry within the light units is configured in such a manner that processors are turned off unless a signal of an appropriate level and polarity is present at one of the non-ground, signal sensing terminals. Whenever the voltage level on the turn signal terminal, the auxiliary terminal, or the mode terminal rises to a threshold voltage, the processor executes a power-on reset and begins executing the program stored therein. This is accomplished by wiring the signal sensing terminals, through appropriate circuitry to a power terminal of the processor, as well as to input terminals of the processor. The programming and initialization of the signal sensing terminals may be such that the processor periodically polls the signal sensing terminals to determine if any states have changed. More preferably, levels on the signal sensing terminals may generate interrupts which are serviced in a selected hierarchy to give precedence to turn signals. When the voltage on a signal sensing terminal drops below a selected level, the processor powers down and turns off. Thus, the processor re-boots for each pulse of a pulsating or intermittent turn signal. The processor operates at a fast enough clock speed to respond to the pulses of a turn signal with no apparent delay.

Various objects and advantages of this invention will become apparent from the following description taken in relation to the accompanying drawings wherein are set forth, by way of illustration and example, certain embodiments of this invention.

The drawings constitute a part of this specification, include exemplary embodiments of the present invention, and illustrate various objects and features thereof.

DETAILED DESCRIPTION OF THE INVENTION

Figure 1:
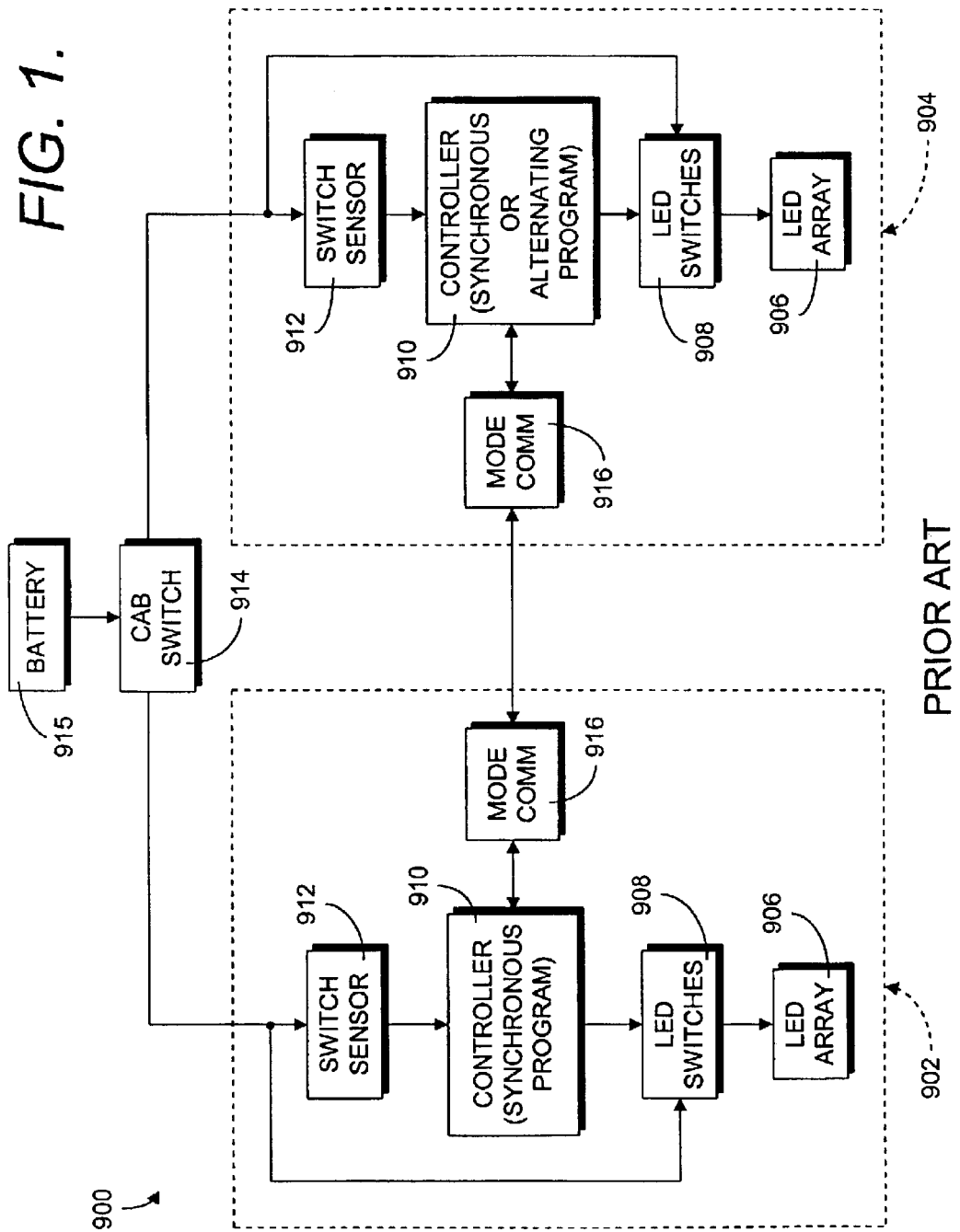
FIG. 1 is a block diagram illustrating a prior art flasher system in which light units with internal control processors are interconnected by communication ports and operated in coordination.

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Referring to the drawings in more detail, the reference numeral 1 (FIGS. 2 and 3) generally designates an integrated multifunction flasher system which embodies the present invention. The system 1 includes a left hand multifunction light unit 3 and a right hand multifunction light unit 4 which are interconnected within the vehicle wiring 6 of a vehicle to provide additional warning lighting in at least partial cooperation with existing, or more conventional, vehicle warning devices.

Figure 2:
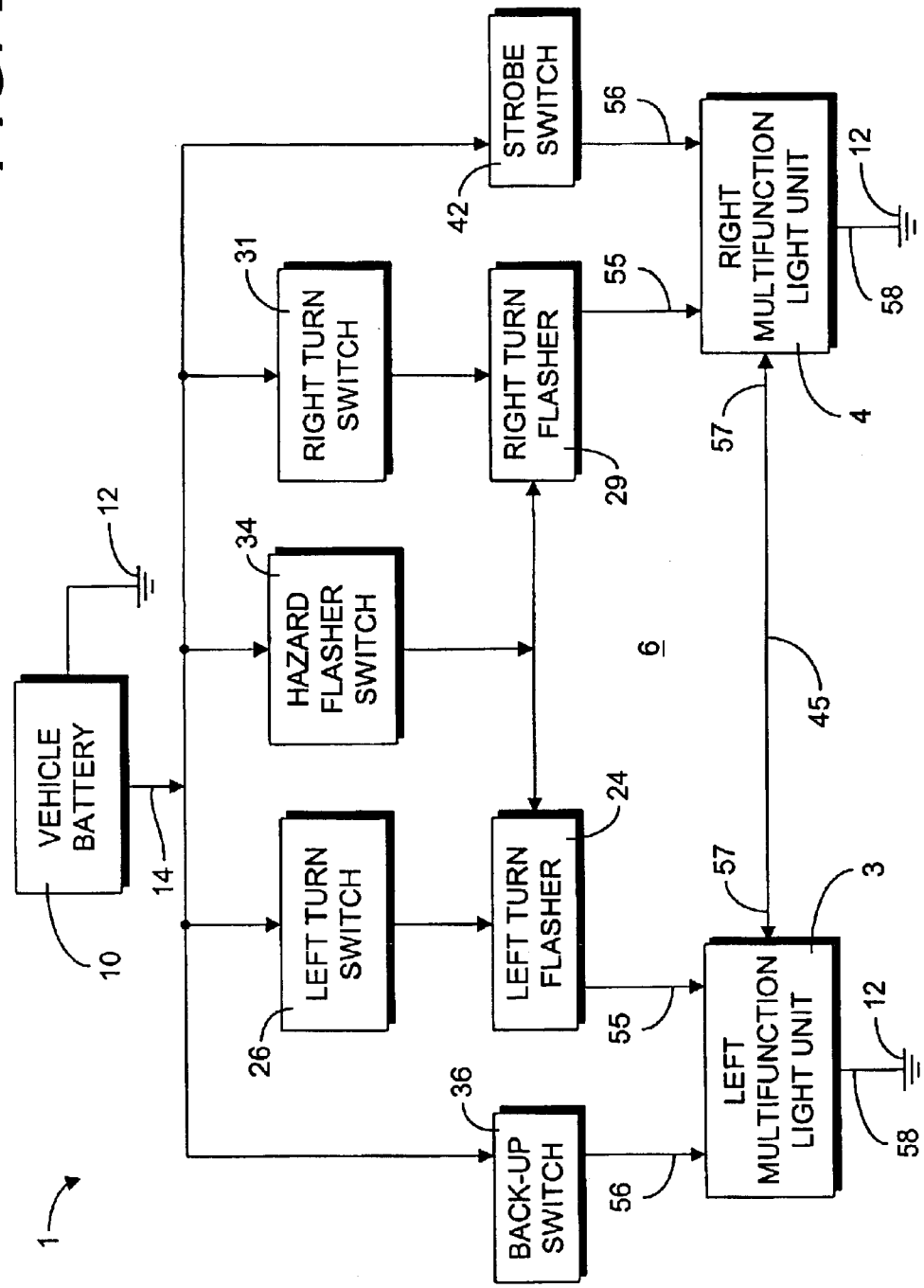
FIG. 2 is a block diagram illustrating an integrated multifunction flasher system which embodies the present invention.
Figure 3:
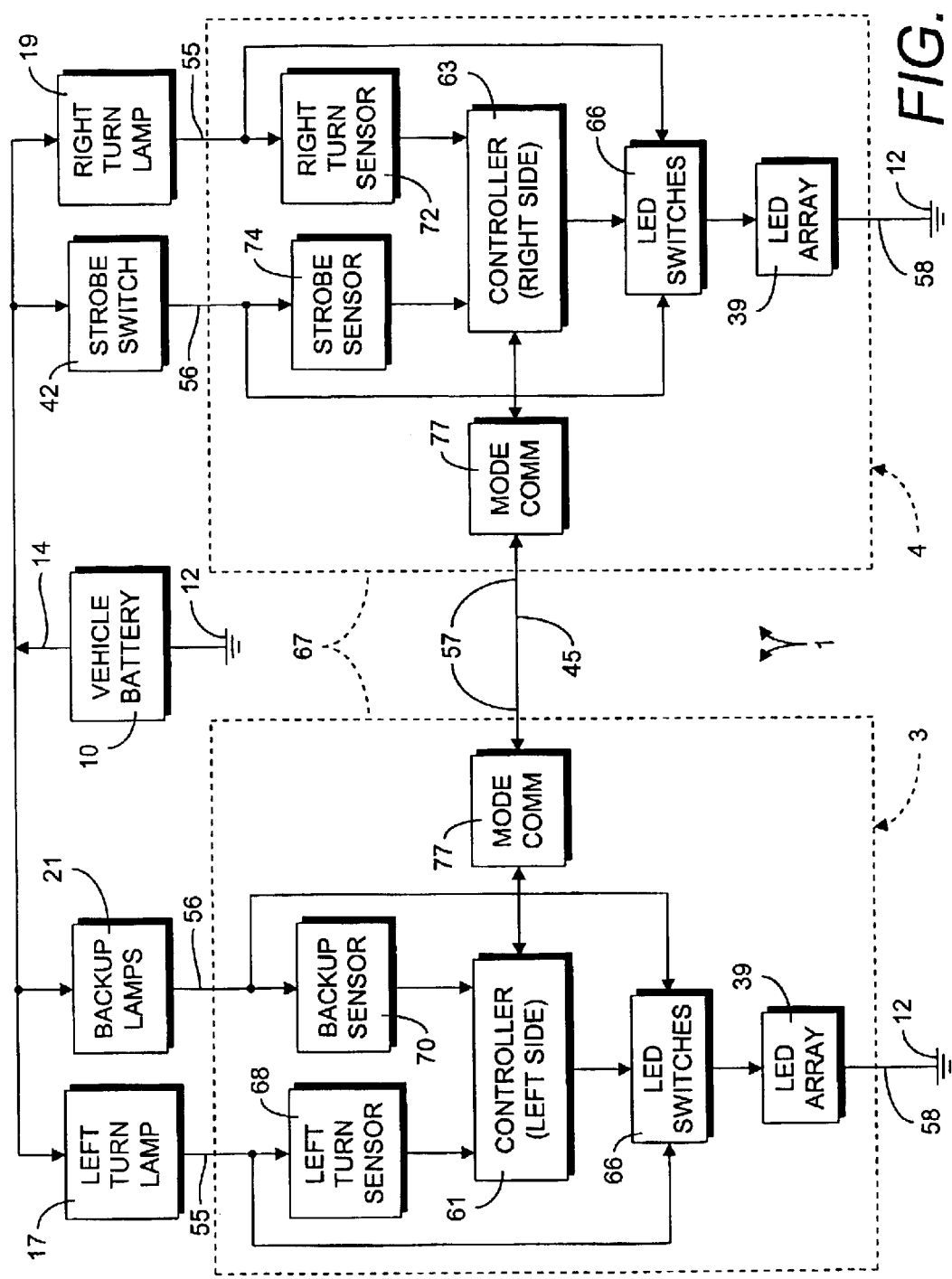
FIG. 3 is a block diagram illustrating components of the integrated multifunction flasher system in greater detail.

Referring to FIGS. 2 and 3, portions of the vehicle wiring 6 of interest to the present invention include a vehicle battery 10 connected between a vehicle ground 12 and a positive battery terminal 14. Existing vehicle warning devices include a left turn lamp 17, a right turn lamp 19, and backup lamps 21. The left turn lamp 17 is activated to flash by an intermittent or pulsating left turn indicator signal derived from battery current by a left turn flasher unit 24 in response to closure of a left turn switch 26. Similarly, the right turn lamp 19 is activated to flash by a right turn flasher unit 29 by closure of a right turn switch 31. The left and right turn lamps 17 and 19 are activated to flash in unison by closure of a hazard flasher switch 34 which may connect to both flasher units 24 and 29 or by a separate hazard flasher unit (not shown). The backup lamps 21 are activated by closure of a backup switch 36 which is associated with a vehicle transmission (not shown) and which is closed when the vehicle transmission is shifted into reverse gear.

Each light unit 3 and 4 includes an illumination element 39 which may be an incandescent lamp or, preferably, an array of high brightness light emitting diodes (LED's). The system 1 adds a strobe flasher switch 42 which is mounted in a cab of the vehicle for selective manual operation by the vehicle driver. Additionally, the light units 3 and 4 are interconnected by a mode or synchronization (mode or sync or mode/sync) communication line 45.

Each light unit 3 or 4 includes a turn indicator terminal 55, an auxiliary terminal 56, a mode communication terminal 57, and a ground terminal 58. The light units. 3 and 4 are mounted on a vehicle in conspicuous locations at the rear of the vehicle. The turn indicator terminals 55 are connected to vehicle wiring for the left and right turn lamps 17 and 19. The auxiliary terminal 56 of the left light unit 3 is connected to wiring for the backup lamps 21, while the auxiliary terminal 56 of the right light unit 4 is connected to the strobe switch 42. The mode terminals 57 are interconnected by the communication line 45, and the ground terminals 58 are connected to the vehicle ground 12.

The left and right light units 3 and 4 include controllers or processors 61 and 63 respectively which control activation of the LED arrays 39, depending on the presence and combinations of voltage levels on the non-ground, sensing terminals 55, 56, and 57. Each controller 61 and 63 controls its LED array 39 by way of a respective set of LED switches or drivers 66. The LED switches 66 are preferably transistors which apply electrical power from the vehicle battery 10 to the LED arrays 39, as enabled by the controllers 61 and 63. The light emitting diodes forming a given array 39 are preferably activated in unison. However, they could also be activated in selected groups in a timed manner to create desired flash patterns. The controllers 61 and 63 are mounted within a light enclosure 67 of each light unit 3 and 4 along with the LED array 39, LED switches 66, and other circuitry.

The left controller 61 and the right controller 63 are identical, except for internal programming. Alternatively, the programming for the controllers 61 and 63 could be identical, depending on the desired response to the activation of the backup switch 36 and the strobe switch 42. The controllers 61 and 63 are preferably programmed microprocessors or microcontrollers. A particularly appropriate processor is the PIC 12C671 manufactured by Microchip Technology, Inc. of Chandler, Ariz. (www.microchip.com). Alternatively, other brands and models of processors could be employed.

The left light unit 3 includes left turn sensor circuitry 68 and backup sensor circuitry 70. Similarly, the right light unit 4 includes right turn sensor circuitry 72 and strobe switch sensor circuitry 74. The sensor circuitry 68, 70, 72, and 74 may include isolation elements, such as diodes, to isolate the terminals 55 and 56 within each light unit 3 and 4 from one another and may include level shifting circuitry to shift from the battery voltage to the level required by the processors 61 and 63. The light units 3 and 4 also include mode communication circuitry 77 which includes isolation elements and may also include other elements, as will be detailed further below.

Figure 4:
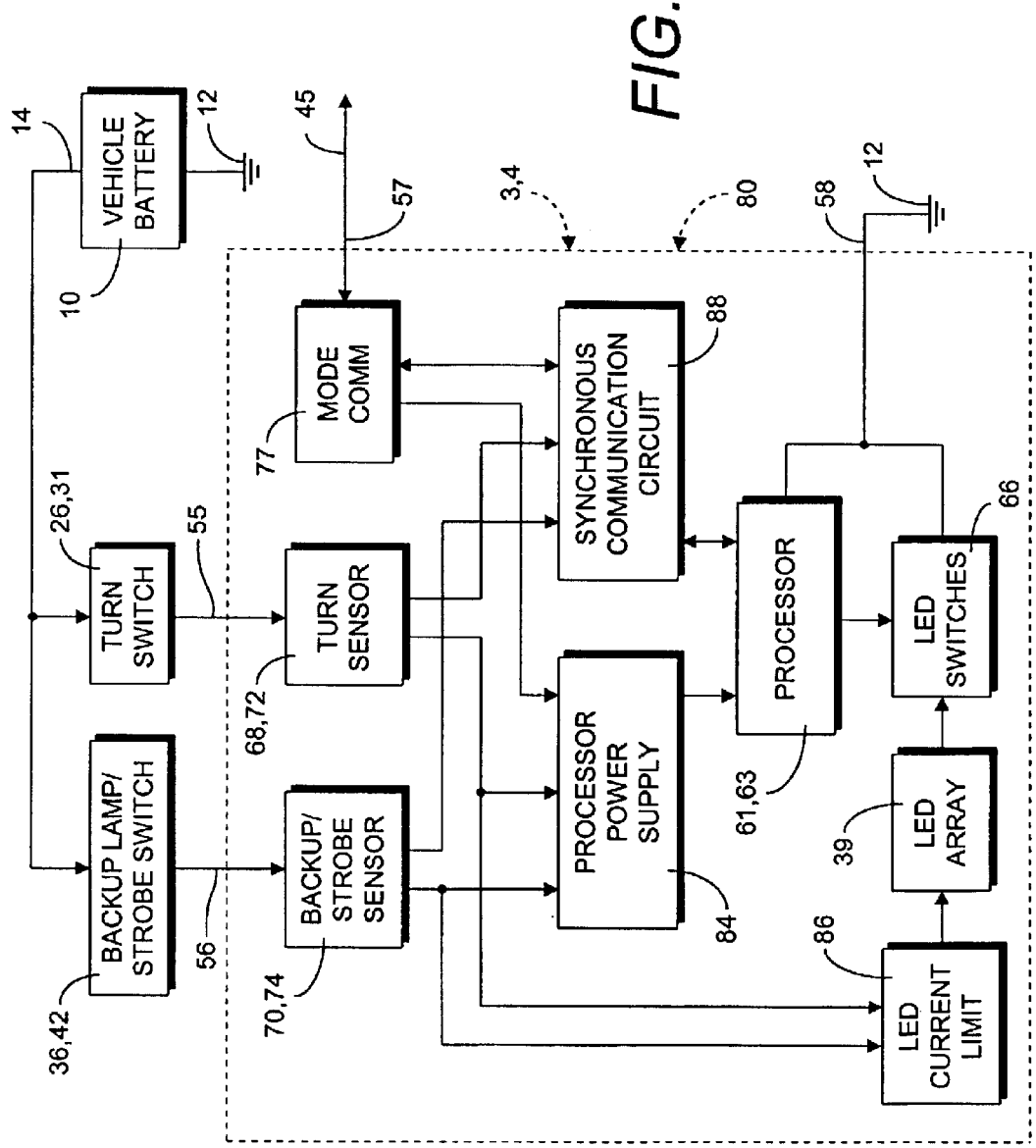
FIG. 4 is a block diagram illustrating principal functional elements of a light unit of the integrated multifunction flasher system of the present invention.

FIG. 4 illustrates a preferred embodiment of the light units 3 and 4, generally referred to as multifunction light unit 80. In the preferred light unit 80, power to operate the processors 61, 63 is derived from the signals applied to the turn indicator terminal 55, the auxiliary terminal 56, or the mode terminal 57 by processor power supply circuitry 84 within the light unit 80. The processors 61, 63 are inactive until a signal of the appropriate level is applied to one of the terminals 55, 56, or 57 of one of the units 80. The steady level provided to a given unit 80 by the backup switch 36 or strobe switch 42, or the pulsating levels of a turn signal, are sufficient to operate the internal processor 61 or 63 and the LED array 39 of a particular unit 80 while present. However, when the back-up signal or a strobe signal is applied to one unit 80, power to operate the processor and LED array of the opposite unit is supplied by way of the communication circuitry 77 and communication line 45. The flash patterns corresponding to the backup signal or strobe signal consist of sequences of 100 millisecond flashes. Thus, the power levels supplied from one unit 80 to the other is minimal. Additionally, the line 45 carries digital mode data and synchronizing signals. The opposite unit 80 responds to the mode data by assuming a compatible mode to the mode signaled by the first unit 80.

The light units 80 also include current limiting circuitry 86 connected between the backup/strobe sensor circuitry 70, 74 and the LED array 39 and between the turn sensor circuitry 68, 72 and the LED array 39. FIG. 4 illustrates synchronous communication circuitry 88 separate from the processors 61, 63, although the circuitry 88 would normally be internal to the processors 61 and 63. The synchronous communication circuitry 88 receives inputs from the backup/strobe sensor circuitry 70, 74 and the turn sensors 68, 72 and communicates bidirectionally and serially with the mode communication circuitry 77 and through the circuitry 77 with the processor in the opposite light unit 80.

In operation, application of an appropriate level to either the turn indicator terminal 55 or the auxiliary terminal 56 of either light unit 3 or 4 causes activation of the local processor 61 or 63, which also signals the processor in the opposite unit 80 to power-up. If the applied signal is a turn signal, the local processor enables the LED switches 66 to activate the local LED array 39 for as long as a pulse of the turn signal persists. When the pulse terminates, the local processor powers down and causes the opposite processor to power down, by way of the communication line 45.

If pulsating turn signals are applied to both light units 3 and 4, that is, if the hazard switch 34 is operated, one processor will be activated first, because of timing tolerances within the unit circuitry of the units 3 and 4, and possibly different lengths of wiring to the units 3 and 4. In any case, the processors 61 and 63 will both enable their LED arrays 39. The overall visual effect of a turn signal applied to a turn signal terminal 55 is that the local LED array 39 is flashed in apparent unison with the existing turn signal lamp. The effect is similar when the hazard switch 34 is operated.

If a level is applied to an auxiliary terminal 56 of one of the units 3 or 4, the local processor 61 or 63 will activate and will activate the opposite processor. The processors 61 and 63 will then alternately enable their respective LED arrays 39 in selected flash patterns. The processors 61 and 63 can be programmed to generate different flash patterns, depending on whether the backup lamp 21 or the strobe switch 42 is activated.

While the processors 61 and 63 are generating their flash patterns in response to a level on an auxiliary terminal 56, the processors 61 and 63 are monitoring the turn signal terminals 55 for a turn signal. If such a turn signal should be detected, the auxiliary flash patterns cease, and the turn signal response is initiated. By this means turn signals and hazard signals are given precedence over backup and strobe signals. If the backup switch 36 and the strobe switch 42 are closed at the same time, the illustrated processors 61 and 63 generate the same alternating flash patterns, as if only one of the switches 36 or 42 were closed. When the backup switch 36 or the strobe switch 42 is opened, the processors 61 and 63 power down and the alternating flash patterns cease.

The system 1 of the present invention provides flashing turn signals which parallel the existing turn signals, an alternating strobe signal when the existing backup lamps are activated, and a manually activated alternating strobe signal. Although the system 1 has been described principally in terms of an add-on system, it could conceivably be incorporated into a newly manufactured vehicle as original equipment.

It is to be understood that while certain forms of the present invention have been illustrated and described herein, it is not to be limited to the specific forms or arrangement of parts described and shown.

What is claimed and desired to secure by Letters Patent is:

1. A multifunction flasher light apparatus comprising:
   (a) an illumination element mounted in a light housing and illuminating in response to electrical activation;
   (b) a controller circuit positioned in said housing, coupled to said illumination element, and operative to apply electrical power to said illumination element to cause illumination of same in response to selected conditions;
   (c) a turn indicator terminal coupled to said controller circuit, said controller circuit causing said illumination element to activate intermittently in response to application of an intermittent turn indicator signal to said turn indicator terminal;
   (d) an auxiliary terminal coupled to said controller circuit, said controller circuit causing said illumination element to illuminate in a selected flash pattern in response to application of a selected auxiliary signal to said auxiliary terminal; and
   (e) a communication terminal coupled to said controller circuit, said controller circuit apply ing a respective mode signal to said communication terminal in response to application of said turn indicator signal to said turn indicator terminal or said auxiliary signal to said auxiliary terminal.

2. An apparatus as set forth in claim 1 and including:
   (a) said controller circuit controlling activation of said illumination element in a selected manner upon application of a respective mode signal to said communication terminal.

3. An apparatus as set forth in claim 2 wherein:
   (a) said apparatus comprises a first apparatus;
   (b) said first apparatus is combined with a second apparatus substantially similar to said first apparatus; and
   (c) a first communication terminal of said first apparatus is coupled to a second communication terminal of said second apparatus to enable coordinated operation of said first apparatus and said second apparatus.

4. An apparatus as set forth in claim 1 wherein:
   (a) said apparatus is installed on an automotive vehicle; and
   (b) said auxiliary signal is a backup signal activated by placing said vehicle in a reverse gear.

5. An apparatus as set forth in claim 1 wherein:
   (a) said apparatus is installed on an automotive vehicle; and
   (b) said auxiliary signal is a strobe signal activated manually by a driver of said vehicle.

6. An apparatus as set forth in claim 1 and including:
   (a) said controller circuit including a programmed microprocessor.

7. An apparatus as set forth in claim 1 and including:
   (a) said controller circuit including a programmed microprocessor; and
   (b) said microprocessor being coupled to said turn indicator terminal and said auxiliary terminal in such a manner that said microprocessor is activated only in response to application of said turn indicator signal to said turn indicator terminal and/or application of said auxiliary signal to said auxiliary terminal.

8. An apparatus as set forth in claim 1 and including:
   (a) said controller circuit controlling activation of said illumination element in a selected manner upon application of a respective mode signal to said communication terminal;
   (b) said controller circuit including a programmed microprocessor; and
   (c) said microprocessor being coupled to said turn indicator terminal, said auxiliary terminal, and said communication terminal in such a manner that said microprocessor is activated only in response to application of said turn indicator signal to said turn indicator terminal and/or application of said auxiliary signal to said auxiliary terminal and/or application of said mode signal to said communication terminal.

9. An apparatus as set forth in claim 1 wherein:
   (a) in response to application of said turn indicator signal to said turn indicator terminal concurrent with application of said auxiliary signal to said auxiliary terminal, said controller circuit causing said illumination element to activate intermittently in response to said intermittent turn indicator signal.

10. An apparatus set forth in claim 1 wherein:
    (a) said illumination element includes a plurality of light emitting diodes connected in a selected configuration and coupled to said controller circuit.

11. A multifunction flasher system comprising:
    (a) a pair of light units, each light unit including a housing including an illumination element and a controller circuit coupled to said illumination element and operative to apply electrical power to said illumination unit under selected conditions;

(b) each light unit including a turn indicator terminal coupled to the controller circuit associated therewith; in each light unit, the associated controller circuit causing the associated illumination element to activate intermittently in response to application of an intermittent turn indicator signal to the associated turn indicator terminal;

(c) at least one of said light units including an auxiliary terminal coupled to the controller circuit associated therewith; in said one of said light units, the associated controller circuit causing the associated illumination element to activate in a selected flash pattern in response to application of a selected auxiliary signal to said auxiliary terminal;

(d) each light unit including a communication terminal coupled to the controller circuit associated therewith, the communication terminals of said pair of light units being interconnected to enable coordinated operation thereof; and (e) in response to application of said turn indicator signal to the turn indicator terminal of one of said light units or the application of said auxiliary signal to said auxiliary terminal of one of said light units, the associated controller of said one of said light units applying a respective mode signal to the associated communication terminal of said one of said light units.

12. An apparatus as set forth in claim 11 and including:

(a) in response to application of a respective mode signal on the communication terminal of one of said light units, the associated controller circuit controlling activation of the associated illumination element in a selected manner.

13. An apparatus set forth in claim 11 wherein:

(a) said apparatus is installed on an automotive vehicle; and (b) said auxiliary signal is a backup signal activated by placing said vehicle in a reverse gear.

14. An apparatus set forth in claim 11 wherein:

(a) said apparatus is installed on an automotive vehicle; and (b) said auxiliary signal is a strobe signal activated manually a driver of said vehicle.

15. An apparatus as set forth in claim 11 and including:

(a) each controller circuit including a programmed microprocessor.

16. An apparatus set forth in claim 11 and including:

(a) each controller circuit including a programmed microprocessor; and (b) said microprocessor being coupled to said turn indicator terminal and said auxiliary terminal of a light unit with which said microprocessor is associated in such a manner that said microprocessor is activated only in response to application of said turn indicator signal to associated turn indicator terminal and/or application of said auxiliary signal to the associated auxiliary terminal.

17. An apparatus as set forth in claim 11 and including:

(a) each controller circuit of a light unit controlling activation of the associated illumination element in a selected manner upon application of a respective mode signal to the associated communication terminal;

(b) each controller circuit including a programmed microprocessor; and (c) the microprocessor of a respective light unit being coupled to the associated turn indicator terminal, auxiliary terminal, and communication terminal in such a manner that said microprocessor is activated only in response to application of said turn indicator signal to the associated turn indicator terminal and/or application of said auxiliary signal to the associated auxiliary terminal and/or application of said mode signal to the associated communication terminal.

18. An apparatus as set forth in claim 11 wherein:

(a) in response to application of said turn indicator signal to said turn indicator terminal of a respective light unit concurrent with application of said auxiliary signal to said auxiliary terminal of said light unit, the associated controller circuit causing the associated illumination element of said light unit to activate intermittently in response to said intermittent turn indicator signal.

19. An apparatus as set forth in claim 11 wherein:

(a) each illumination element of a respective light unit includes a plurality of light emitting diodes connected in a selected configuration and coupled to said controller circuit of said light unit.

* * * * *